(12) United States Patent
Stratico et al.

(10) Patent No.: US 6,923,399 B1
(45) Date of Patent: Aug. 2, 2005

(54) MANUFACTURING METHODS AND APPARATUS FOR TERMINATING DYNAMO-MACHINE COMPONENT WIRE COIL LEADS

(75) Inventors: Gianfranco Stratico, Siena (IT); Maurizio Mugelli, Siena (IT)

(73) Assignee: Axis USA, Inc., Tampa, FL (US)

( * ) Notice: Subject to any disclaimer, the term of this patent is extended or adjusted under 35 U.S.C. 154(b) by 86 days.

(21) Appl. No.: 10/288,640

(22) Filed: Nov. 4, 2002

Related U.S. Application Data

(60) Provisional application No. 60/338,532, filed on Nov. 6, 2001.

(51) Int. Cl.[7] .......................................... H02K 15/085
(52) U.S. Cl. ..................................... 242/432.6; 29/596
(58) Field of Search .......................... 242/432.6, 433.4, 242/434, 434.9; 29/596

(56) References Cited

U.S. PATENT DOCUMENTS

| | | | |
|---|---|---|---|
| 4,969,606 A | 11/1990 | Santandrea et al. | |
| 5,137,221 A | 8/1992 | Santandrea et al. | |
| 5,149,000 A | 9/1992 | Santandrea et al. | |
| 5,233,751 A * | 8/1993 | Luciani et al. | 29/736 |
| 5,257,745 A | 11/1993 | Lombardi et al. | |
| 5,288,088 A | 2/1994 | Santandrea et al. | |
| 5,535,503 A * | 7/1996 | Newman | 29/596 |
| 5,615,472 A * | 4/1997 | Bouman et al. | 29/596 |
| 5,755,021 A * | 5/1998 | Beakes et al. | 29/596 |
| 5,950,300 A * | 9/1999 | Newman | 29/596 |
| 6,108,897 A * | 8/2000 | Beakes et al. | 29/596 |
| 6,616,082 B2 * | 9/2003 | Burch | 242/432.4 |
| 6,626,392 B2 * | 9/2003 | Kajita | 242/432.6 |

* cited by examiner

Primary Examiner—Emmanuel Marcelo
(74) Attorney, Agent, or Firm—Fish & Neave IP Group of Ropes & Gray LLP; Jeffrey H. Ingerman

(57) ABSTRACT

Methods and apparatus for terminating dynamoelectric machine component wire coil leads in situ in automated wire coil winding machines are provided. A shape-forming wire-termination fixture is disposed about the front face of the dynamoelectric machine component. After the wire coils have been wound, a movable wire gripper is used to grasp and manipulate the starting and ending wire leads of the wound coils one at a time. The wire leads are terminated by deforming them around the wire-termination fixture to form freestanding geometrical patterns in them. Machine component-holding pick and place devices may be used to remove components with terminated wire leads from the winding machine for further processing.

57 Claims, 4 Drawing Sheets

MANUFACTURING METHODS AND APPARATUS FOR TERMINATING DYNAMO-MACHINE COMPONENT WIRE COIL LEADS

This application claims the benefit of U.S. provisional application No. 60/338,532 filed Nov. 6, 2001.

BACKGROUND OF THE INVENTION

The present invention relates to improved solutions for processing dynamo-electric machine components (e.g., armatures or stators for electric motors, generators, or alternators) through wire coil winding steps.

Wire coils are an integral part of the dynamo-electric machine components such as armatures and stators. The wire coils are made of insulated wire wound on ferromagnetic poles. The ferromagnetic poles may be formed, for example, in the case of a stator, by adjacent longitudinal slots running along the inner surface of the stator core. The wound wire coil ends or leads are connected to terminal posts or boards on the component. In the operation of the dynamo-electric machine, electric voltage is applied to the terminal posts. As a result electric current passes through these wire coils generating electro-mechanical torques which cause the dynamo-electric machine armature to rotate. Wire coil-winding specifications (such as wire size, pitch, number of turns, and winding (pole) configuration) determine the operational rotational characteristics of the dynamo-electric machine.

The dynamo-electric machine component wire coils are often wound using automated coil winding machinery that includes a wire dispenser or needle mounted on a moving arm, which dispenses wire drawn from a wire spool. Exemplary winders are described, for example, in commonly-assigned Santandrea et al. U.S. Pat. No. 4,969,606, Santandrea et al. U.S. Pat. No. 5,149,000, Santandrea et al. U.S. Pat. No. 5,137,221, Santandrea et al. U.S. Pat. No. 5,288,088 and, Stratico et al., U.S. Pat. No. 5,257,745, and Stratico et al. U.S. Patent Application Publication U.S. 2002/0020778, each of which is incorporated by reference in its entirety herein. For example, for winding stator coils, the automated machinery may be used to have the wire dispenser travel back and forth through the stator bore alongside a pole, dispensing wire stretches that are deposited on the pole sides and ends to form the stator coil to design specifications. After the coil is wound, wire leads from the starting and ending wire stretches of the stator wire coil may be cut to suitable lengths and terminated. The terminated wire leads are then routed along safe paths, which do not mechanically or electrically interfere with machine operation, and fastened or attached to terminal posts on the stator. Initially, the cut wire leads may be held in temporary positions secured by wire grippers while the stator core is being processed in the winding machinery. The wire termination and final routing and terminal attachment procedures are often carried out either manually or using automated wire termination and connection machines after the stator core has been moved out from the winding machinery.

Unfortunately, conventional routing and attachment procedures may unwind, loosen, dislodge, or other wise degrade the wound wire coil. For example, pulling on the starting wire stretch, which is invariably buried under subsequent wire stretches, may dislodge or otherwise disturb the wound wire coil. An ending wire stretch that is loose or not held taut may cause the wound wire coil to unravel or unwind. Further, the handling of the starting and ending wire stretches may nick, scratch or otherwise damage wire insulation. Damaged wire insulation can lead to electrical shorts or leakage, which can degrade dynamo-electric machine performance or cause machine failure.

Consideration is now being given to ways of providing solutions for improving dynamo-electric machine component manufacture. Attention is directed toward methods and apparatus for terminating stator wire coil leads, with a view to make wire lead routing and fastening procedures less disturbing to wound wire coils, and to improve the overall quality of dynamo-electric machine components.

SUMMARY OF THE INVENTION

In accordance with the principles of the invention, methods and apparatus for the termination of dynamo-electric machine component wire coil lead portions are provided. The inventive methods and apparatus may be used for in situ wire lead termination in the automated wire winding machines in which the dynamo-electric machine component wire coils are formed.

The wire-termination apparatus includes a shape-forming wire-termination fixture and a programmably movable wire manipulator. The wire manipulator may be any conventional wire manipulator that is capable of grasping and manipulating or moving the wound coil wire leads. The wire-termination fixture generally has a cylindrical shape. The wire-termination fixture and wire manipulator are structurally integrated into conventional dynamo-electric machine component coil wire-winding machines for in situ wire lead termination after the wire coils have been wound.

In one embodiment applicable, for example, to the termination of stator wire coil leads, the wire-termination fixture includes a main trunk portion, a front extreme portion, a rear attachment portion, and key members. The attachment portion is used to attach or mount the wire-terminating fixture to movable components or mechanisms in the wire-winding machine. The main trunk and contiguous front extreme portion have cylindrical shapes, with the latter having a smaller diameter than the former. The main trunk portion generally conforms in size and shape to the stator bore spacing between opposing stator poles on which wire coils C are wound. The key members, which are disposed on the opposite sides of the main trunk portion, are designed to occupy the outer annular space in the stator bore that is clear of the stator poles. The key member sides function as restraints that confine stator wire coil stretches to the pole slots. The combined length of the wire-termination fixture is such that the extreme portion protrudes from the front face of the stator and extends beyond the stator poles when the fixture is inserted through the bore of an in-process stator.

In operation the wire-terminating fixture is inserted in the stator bore from the rear after wire coils have been wound on the stator poles. The extreme portion of inserted wire-terminating fixture protrudes out of the front face of the stator and extends beyond the stator poles. Using the wire manipulator the wound coil wire leads are grasped and wrapped around the shape-forming fixture to give them deformed shapes that are suitable for wire termination. Key member sides of the inserted wire-termination member prevent the stator wire coils from unraveling during the wrapping process. The wire lead deformation is designed to produce freestanding geometrical patterns in the terminated wire leads. The freestanding geometrical patterns may have shapes (e.g., circular loops) conforming to the shape of the wire-termination fixture on which the wire leads are wrapped. Next, the wire-termination fixture is withdrawn from the stator bore leaving the terminated wire leads with the freestanding patterns suspended in the front of the stator. Stators with terminated coil wire leads suspended about the front face can then be removed from the wire-winding machine for further processing, for example, at terminal connection workstations.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which.

Figure 1:
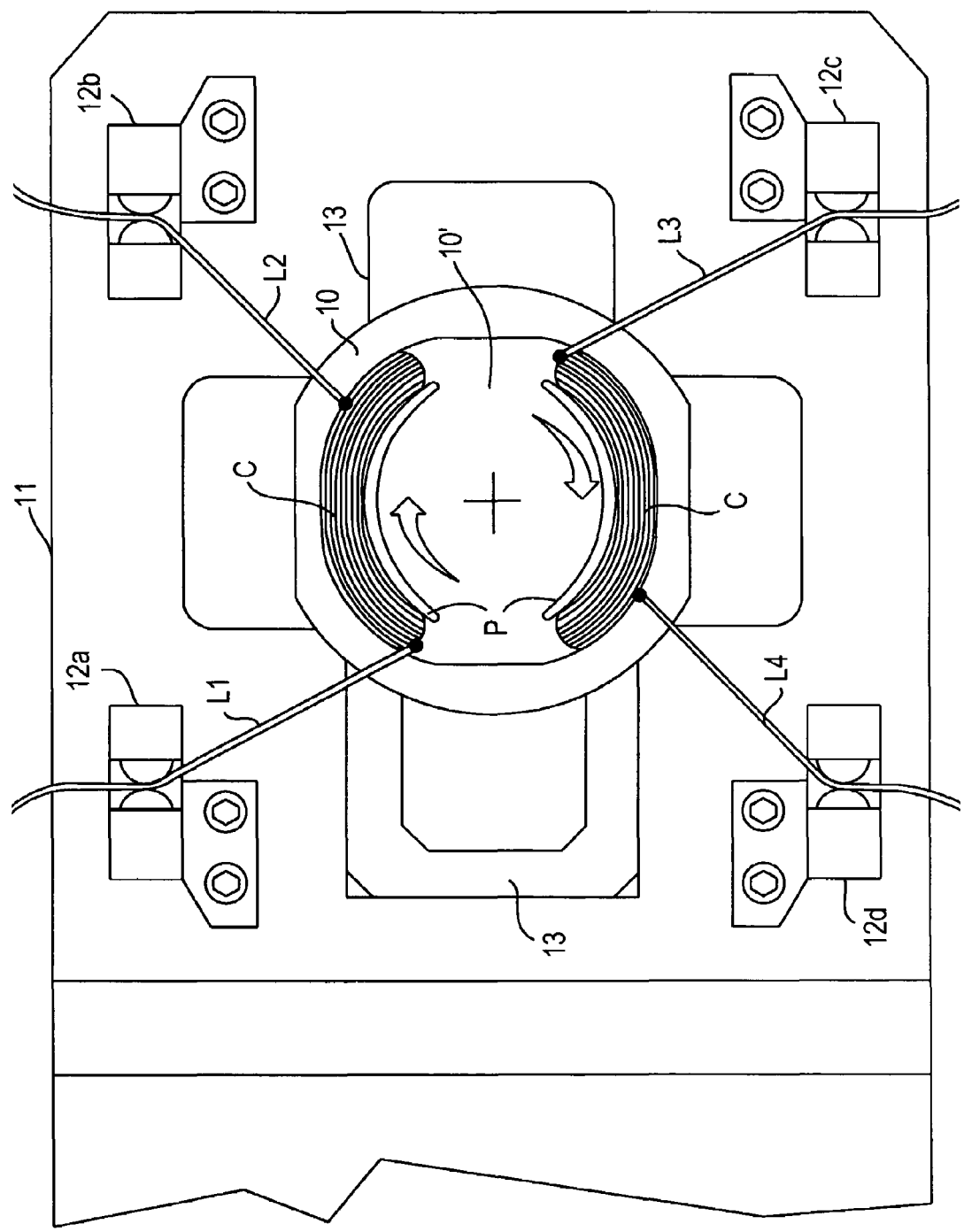
FIG. 1 is a side elevation view of a stator core held in an automated wire-winding machine that includes a wire-termination fixture, in accordance with the principles of the present invention. The stator core is shown at an illustrative step in the wire coil winding process at which wound coil wire leads are held in temporary anchoring grippers. The wire-termination fixture is not seen at this process step in this view.

In several of the accompanying drawings, which show sectional views, hatching or shading of various sectional elements may have been omitted for clarity. It will be understood that this omission of hatching or shading in the drawings is for the purpose of clarity in illustration only.

DETAILED DESCRIPTION OF THE PREFERRED EMBODIMENTS

The present disclosure provides solutions for uniform and reproducible manufacturing of dynamo-electric machine components. A disclosed solution concerns methods and apparatus for the termination of stator coil wire lead portions, which may then be physically routed and attached to one or more terminals mounted on the stator core. The terminals may, for example, be the electrical current or voltage supply terminals of the dynamo electric machine in which the stator is used. The terminated coil leads may be physically positioned along suitable paths, which do not interfere with the operation of the dynamo-electric machine.

The inventive wire-termination apparatus and fixtures may be integrated with or built into conventional wire coil winding machines so that the wire termination steps may be accomplished in the same machine or workstation as the wire coil winding. Alternatively, the inventive wire-termination apparatus may be used at subsequent workstation. In order that the invention herein described can be fully understood, the subsequent description is set forth in the context of the manufacture of stators. It will, however, be understood that the invention is equally applicable to other types of dynamo-electric machine components.

Exemplary stator coil winding machines in which the inventive methods and apparatus may be used generally include a stator housing and contain mechanical chucks to hold in-process stators as wire coils are wound on the stator poles. (See e.g., Santandrea et al. U.S. Pat. Nos. 4,969,606, and 5,149,000). The stator housing may further include wire grippers or other means that can be used to temporarily hold and present wire coil leads in a an orientation suitable for further operations after the wire coils are wound. The wire grippers may, for example, be similar to those disclosed in Santandrea et al. U.S. Pat. No. 5,137,221 or Santandrea et al. U.S. Pat. No. 5,288,088, both of which are incorporated by reference herein.

In order that the invention herein described may be easily understood, the subsequent description is set forth with reference to the FIGS. using a two-pole stator core 10 having a single coil wound on each pole as an exemplary workpiece. A pair of C-shaped chucks 13 within an exemplary wire-winding machine may hold stator core 10 during the wire coil winding process. One or both of chucks 13 may be movable. FIG. 1 shows, for example, movable left chuck 13 and fixed right chuck 13. It will, however, be understood that invention is equally applicable to stators having different pole and coil configurations, and to wire-winding machines that may use different or alternative mechanical configurations to hold in-process stators or other dynamo-electric machine components.

FIG. 1 shows stator core 10 on whose poles a pair of wire coils C have been wound using a movable wire dispenser (not shown) in an wire-winding machine. Stator core 10 is held in a suitable orientation by chucks 13 in the stator core housing 11 of the wire-winding machine during the coil winding operations. Stator core 10 is shown in FIG. 1 after completion of the winding operations at a process stage in which starting and ending wire leads from the pair of wire coils C ((L2, L4) and (L1, L3), respectively) are secured to housing 11. Grippers 12a–12d that are mounted on housing 11 are used to secure the wire leads L1–L4. Grippers 12a–12d may have any suitable mechanical configuration for releasably holding wire leads. The mechanical configuration may, for example, include resiliently biased opposing surfaces that are similar to those described in Santandrea et al. in U.S. Pat. Nos. 5,137,221 and 5,288,008 to hold the wire leads.

The wire coil winding process stage shown in FIG. 1 is similar to the process stage in conventional stator coil winding operations after which stator housing 11 in the conventional operations is moved from the wire-winding machine to a separately located termination station in preparation for terminating and connecting the wire leads to the stator terminals. See e.g., Luciani et al. U.S. Pat. Nos. 5,065,503 and 5,245,748.

In the inventive method described herein the wire lead termination operations may be carried out in the wire-winding machine itself, keeping stator 10 in the same location for both coil winding and wire lead termination processes. A wire-termination fixture or member may be used in conjunction with movable wire manipulators to terminate wound stator coil wire leads in situ. The wire-termination fixture and wire manipulator configuration may be structurally integrated into the wire-winding machine for this purpose.

Figure 2:
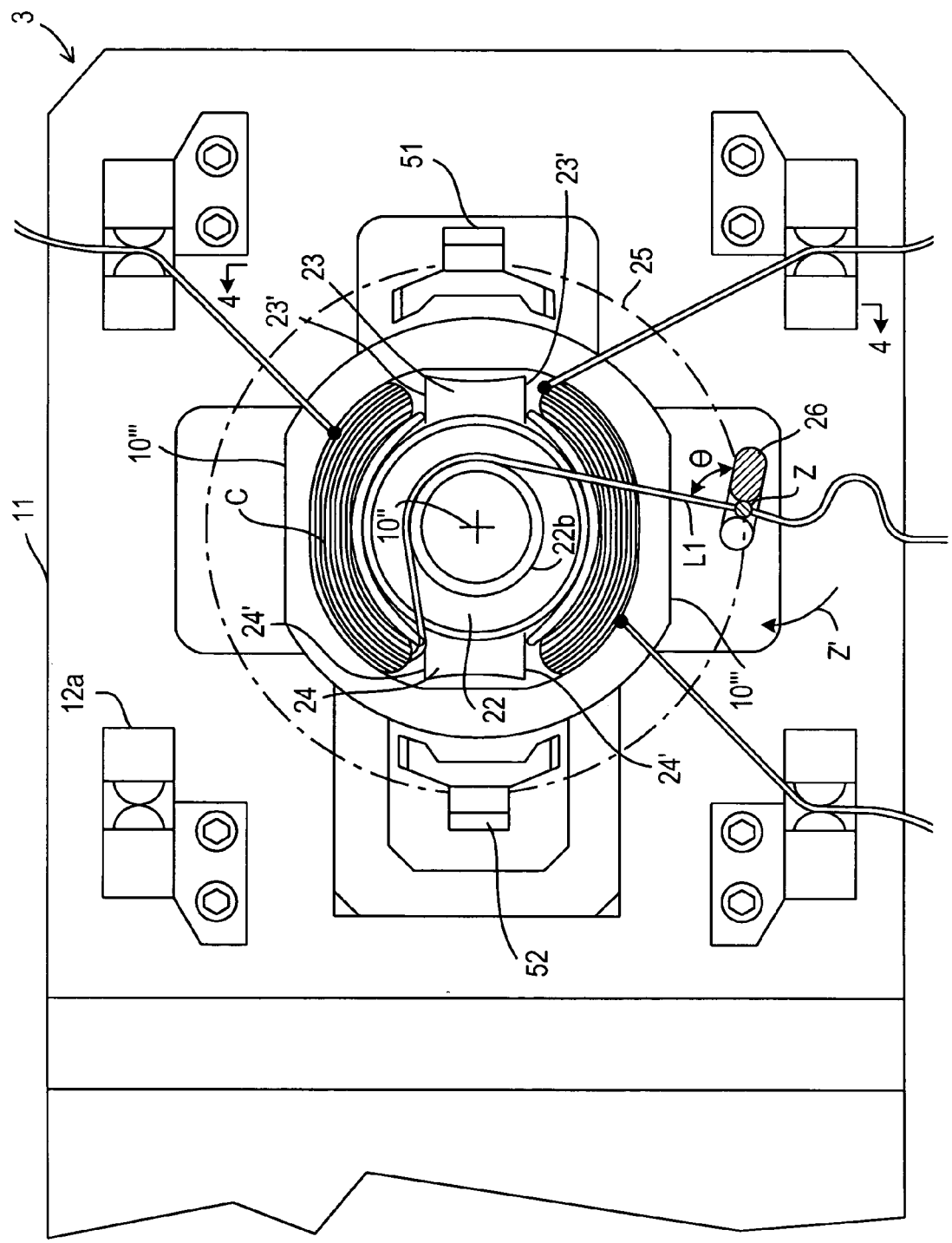
FIG. 2 is a similar side elevation view of the stator core held in the automated wire winder machine of FIG. 1 at a subsequent process step at which the wire termination fixture has been inserted in the stator bore in accordance with the principles of the present invention.

The wire manipulators may be any suitable manipulator that is capable of grasping and manipulating the coil lead wires. These wire manipulators (e.g., manipulator 26 FIG. 2) may, for example, be similar to those that are described in Luciani et al. U.S. Pat. Nos. 5,065,503 and 5,245,748. With reference to FIG. 2, wire manipulator 26 may be disposed in the wire-winding machine on movable arms or guides (not shown). Wire manipulator 26 may be programmably moved in trajectories that are either parallel or perpendicular to the front face of housing 11, or both. Wire manipulator 26 may include conventional grasping mechanisms that allow the grasped wire to slide through as wire manipulator 26 moves parallel across the front face. Further, wire manipulator 26 may be disposed on the movable arm so that it (manipulator 26) may rotate freely about its longitudinal axis Z. This free axial rotation may enable wire manipulator 26 to self-adjust and maintain its orientation with respect to a grasped wire at a substantially constant angle (θ) while moving across the front face of housing 11. Wire manipulator 26 may be used to manipulate wire leads around the wire-termination fixture during the in situ wire lead termination processes or procedures. The wire-termination fixture may be used as a wire shaping form.

FIG. 2 shows, for example, an exemplary wire-terminating fixture 22 (FIG. 3) that has been introduced from behind stator core 10 into the stator bore 10' and extends beyond the front face of stator core 10.

Figure 3:
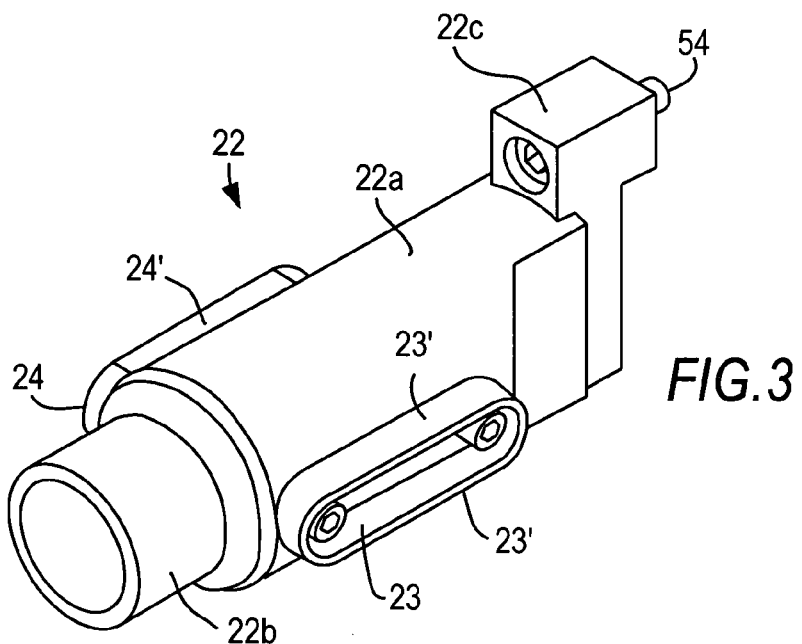
FIG. 3 is a perspective view of the wire termination fixture of FIG. 2, as seen from direction 3 in FIG. 2.
Figure 4:
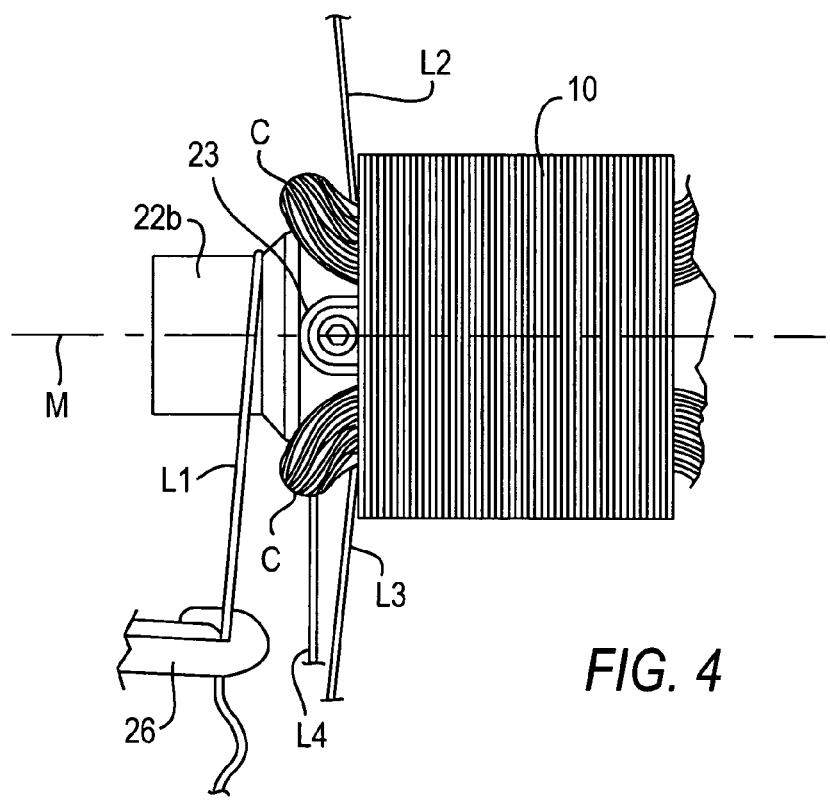
FIG. 4 is another view of the wire-termination fixture as seen from line 4—4 of FIG. 2. Portions of the winding machine housing have been omitted to show the details of the disposition of the wire termination fixture relative to the stator core.

With reference to FIGS. 2–4, wire-termination fixture 22 has a generally cylindrical shape. Wire-termination fixture 22 includes a main trunk portion 22a, a front extreme portion 22b, a rear attachment portion 22c, and key members 23 and 24. Attachment portion 22c may be used to suitably mount or attach wire-terminating fixture 22 to the wire-winding machine mechanisms so that wire-termination fixture 22 can be moved in or out of in-process stators. Attachment portion 22c is mechanically connected with main trunk portion 22a. The shape of main trunk portion 22a generally conforms in size and shape to stator bore 10' space between opposing stator poles P (on which coils C are wound).

Key members 23 and 24 are disposed on the opposite sides of main trunk portion 22a. Key members 23 and 24 may be disposed in a suitable orientation so that when termination fixture 22 is inserted in bore 10' key members 23 and 24 occupy the outer annular space in bore 10' that is clear of pole faces P and wire coils C. Key member sides 23' and 24' deployed in that annular space may function as stops or restraints which confine wire stretches of wire coils C to the pole slots.

Main trunk portion 22a extends or tapers into extreme portion 22b. Extreme portion 22b may, for example, have a generally cylindrical shape with a diameter that is smaller than of main trunk portion 22a. Both portions 22a and 22b may be fabricated from suitable solid or tubular materials. The combined length of the two portions may be suitably chosen to be longer than the length of stator poles P. With this combined length, extreme portion 22b protrudes from the front face of stator core 10 or extends beyond poles P; when termination member 22 is inserted through stator bore 10' (see e.g., FIG. 6).

The in-situ wire termination method may be further understood with reference to FIGS. 2–6. FIG. 2 shows, for example, lead wire L1 during the wire termination process after it has been grasped by wire manipulator 26, released from gripper 12a, and moved across a front plane of housing 11 to a position in which it is partially wrapped around extreme portion 22b. In arriving at the wire positions similar to those shown in FIG. 2, at a first step in the termination process, wire manipulator 26 may be programmed to grasp a lead wire (e.g., lead L1) at a spot in between coils C and the corresponding wire gripper (e.g., gripper 12a). Then wire manipulator 26 may be moved in a trajectory, which is perpendicularly away from a front plane or front face of housing 11, to pull grasped lead wire L1 out of corresponding gripper 12a. Conventional pulling of wound coil wire leads may tend to unravel wire coil C by pulling additional wire lengths or wire stretches from wound coil C. The pulling of an ending wire lead such as L1 or L3, which unlike starting wire leads L2 and L4 are not buried under wire coils C, may be particularly prone to unravelling wire coils C. However, here key member side 23' acts as a restraining stop and prevents wire manipulator 26 from pulling additional wire lengths or wire stretches out of coil C even as it pulls lead wire L1 out of gripper 12a.

Further circular or revolving movement of wire manipulator 26 along a circular trajectory 25 about stator core centre 10" wraps grasped wire lead L1 around extreme portion 22b of termination member 22. FIG. 4 illustrates, for example, the partial wrapping of wire lead L1 around extreme portion 22b as wire manipulator 26 revolves around axis M. In FIG. 4 rear portions of key member 23 are omitted for clarity.

The length of wire lead L1 extending from wire manipulator 26 to a contact point on extreme portion 22b may remain relatively constant even as manipulator 26 revolves around axis M because of the concentric geometry of extreme portion 22b and trajectory 25. As wire manipulator 26 moves along trajectory 25 and the contact point of wire lead L1 on extreme portion 22b shifts, lengths of grasped wire lead L1 slide through the grasping mechanism of wire manipulator 26 to compensate for the wire length wrapped around extreme portion 22b. Further, as wire manipulator 26 revolves round axis M it rotates (as indicated by rotation Z'FIG. 2) around its longitudinal axis Z. This self-adjusting rotation allows it (manipulator 26) to maintain a substantially constant angle (θ) with respect to the portion of wire lead L1, which extends from wire manipulator 26 to the contact point on extreme portion 22b. The compensatory sliding of lead L1 and the self-adjusting rotation of wire manipulator 26 permit controlled wrapping of wire lead L1 around extreme portion 22b, and also avoid any undesirable wire entanglement around wire manipulator 26.

The extent of wire manipulator 26 motion along circular trajectory 25 may be programmed to correspond to a predetermined wrapped length of wire lead L1 around extreme portion 22b. After the predetermined length of wire lead L1 is wrapped around extreme portion 22b, wire manipulator 26 may be activated to release grasped wire lead L1. If wire lead L1 is formed of suitably stiff or rigid wire, released wire lead L1 may retain its circular wrapped shape around extreme portion 22b without unravelling. The wrapping of lead L1 around extreme portion 22b deforms lead L1 to create or form a free-standing pattern conforming to the shape or geometry of extreme portion 22b.

Next the remaining wire leads L2–L4, which are anchored in grippers 12b–12d, may be sequentially grasped one at a time by manipulator 26. The grasped wire leads are released from corresponding grippers 12b–12d, and wrapped around extreme portion 22b in a manner similar to that described for wire lead L1. The sequential manipulation of leads 11–14 may be used to physically stagger the placement of leads L1–L4 on extreme portion 22b along axis M. As described earlier in the context of wrapping wire lead L1, key member sides (sides 23' and 24') function as restraints to prevent unravelling of wire stretches from wire coils C even as wire manipulator 26 pulls wire leads L2–L4 out of corresponding grippers 12b–12d.

After all of the starting and ending wire coil leads L1–L4 have been sequentially released from grippers 12a–12d, and wrapped around the cylindrical surface of extreme portion 22b, termination fixture 22 may be withdrawn toward the rear of stator core 10 to complete the wire termination procedures. This withdrawal of termination fixture 22 causes extreme portion 22b to slide out from under wrapped portions of wire leads L1–L4 leaving the leads suspended in front of stator core 10.

Figure 5:
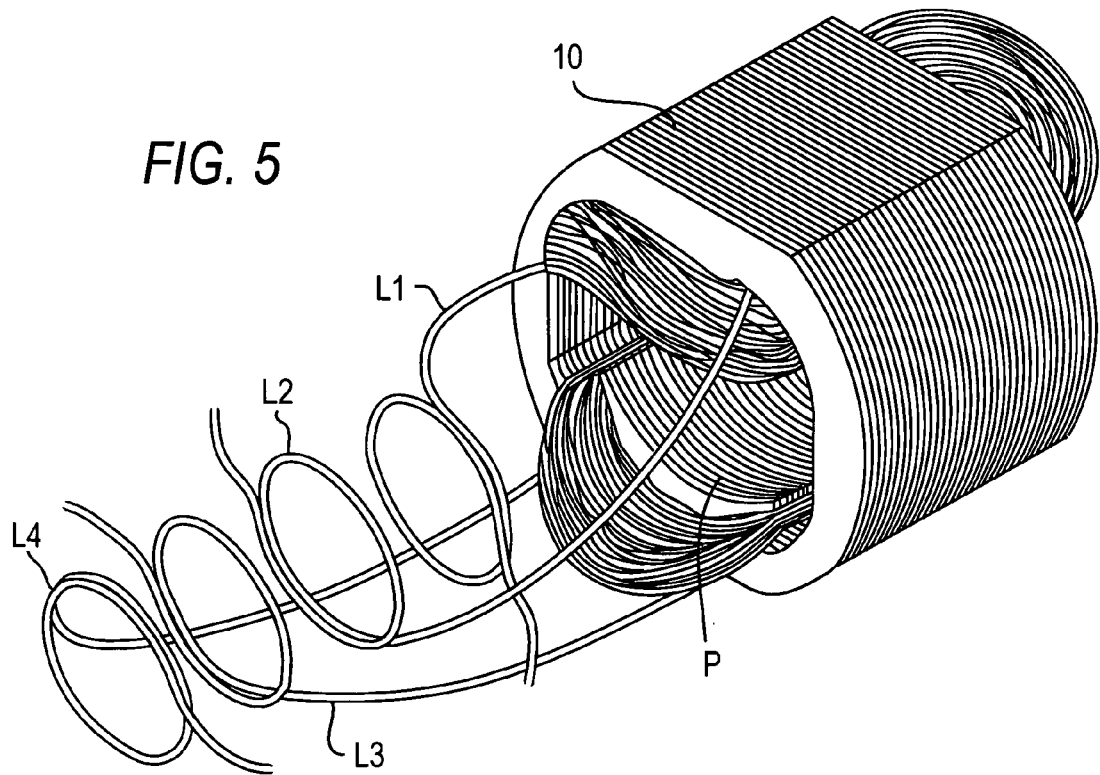
FIG. 5 is a perspective view of the stator core after the stator coil wire leads have been terminated in accordance with the principles of the present invention.

For wire leads L1–L4 made of stiff or rigid material the wrapped portions of leads L1–L4 retain deformed shapes that conform to the geometry of extreme portion 22b even after the latter has been slid out or withdrawn. FIG. 5 shows, for example, lead L1–L4 suspended in front of stator core 10 after withdrawal of termination fixture 22 at the completion of the termination procedures. Suspended leads L1–L4 are physically staggered along the longitudinal axis of stator core 10. Suspended leads L1–L4 retain their deformed shapes, which were formed earlier by wrapping portions of the leads around extreme portion 22b, as freestanding patterns (i.e. closed circular loops) in them. It will be understood that in FIG. 5, the physically staggering or separation between leads L1–L4 along the stator axis has been exaggerated for purposes of clarity in illustration. It will be further understood that the particular closed circular wire loop patterns in terminated leads L1–L4 are chosen for purposes of illustration only. Other equally useful shapes or patterns for terminating wire coil leads may be obtained, for example, by suitable choice of terminating fixture (e.g., fixture 22) shape or geometry, and by suitable choice of the geometry and length of the trajectory (e.g., trajectory 25) along which the wire leads are moved.

Stator core 10 with suspended coil leads L1–L4 terminated in this manner (as shown, for example, in FIG. 5) may removed from the wire-winding machine and transferred to workstations or locations where the terminated leads may be physically connected to stator or dynamo-electric machine terminal boards or posts. The physical connection of the suspended lead wires L1–L4 to terminal boards or posts may be suitably carried out at terminal connection workstations, for example, by human operators.

Figure 6:
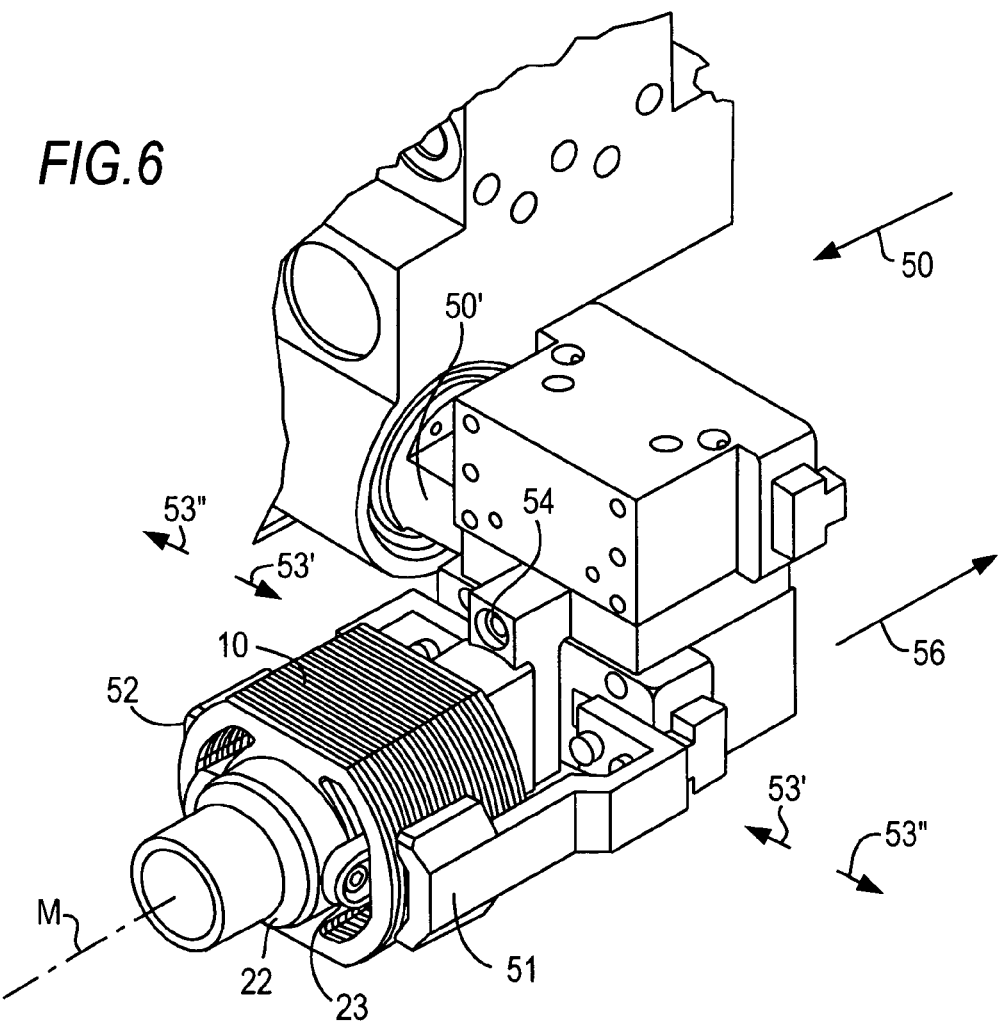
FIG. 6 is another view of the wire-termination fixture as seen direction 3 of FIG. 2. Portions of the winding machine housing have been omitted to show the wire-termination fixture details. Further details of the attachment of the wire-termination fixture to a component pick and place device are shown.

In a further embodiment of the present invention the mechanics of removing stator core 10 out of the wire-winding machine, and the mechanics of inserting and withdrawing wire-termination fixture 22 from stator core 10 during the in-situ wire termination procedures may be combined or integrated. This integrated operation may be understood with reference to FIG. 6. FIG. 6 shows wire-termination fixture 22 in the same position relative to stator core 10 as shown in FIG. 2. Wire-termination fixture 22 is shown inserted in stator core 10. Key member 23 is seen disposed in the annular space adjacent to the edges of stator poles P. However, in FIG. 6 certain components such as housing 11, wire coils C and leads L1–L4 that are shown in FIG. 2 are omitted for clarity but certain additional machine components such as stator core pick and place device 50 are shown in greater detail.

Pick and place device 50 includes movable pliers 51 and 52, which can hold stator core 10, for example, for removal from the wire winding machine after the wire termination procedures are completed. Wire-termination fixture 22 is mechanically attached to pick and place device 50 using, for example, bolt 54. Any suitable design or means may be used to align attached fixture 22 relative to device 50. Pick and place device 50 may, for example, include a centring seat to partially receive attachment portion 22c so that termination member 22 is centred around and extends along middle axis M between pliers 51 and 52. Middle axis M may be substantially coincident with the longitudinal axis of in-process stator core 10 held by chucks 13.

Pliers 51 and 52 may hold in-process stator core 10 in position by contacting the opposite sides of stator core 10. Pliers 51 and 52 may move toward each other (in directions 53') to a closed or holding position in order to contact and hold stator core 10. Conversely, pliers 51 and 52 may move away from each other in directions 53" to an open position to release a held stator core.

C-shaped chucks 13 hold stator core 10 in housing 11 during the wire winding operations (which result in the formation of coils C) (FIG. 1). At the start of wire termination procedures, pick and place device 50 moves forward (opposite to direction 56 FIG. 6) to insert wire-termination fixture 22 into stator core 10 along axis M. During this forward movement pliers 51 and 52 are held in their open positions. As wire-termination fixture 22 is inserted in stator bore 10, pliers 51 and 52 extend into open spaces in C-shaped chucks 13 alongside but not in contact with the outer surfaces of stator core 10 (see FIG. 2). Pliers 51 and 52 are thus positioned in their open positions about stator core 10 ready to subsequently close and hold stator core 10 as necessary.

After the wire termination steps in which leads L1–L4 are disengaged from grippers 12a–12d and wrapped around extreme portion 22b, as described previously, pliers 51 and 52 may be moved to their closed positions to hold stator core 10. Chucks 13 may then be opened to release stator core 10, which is now safely held by pliers 51 and 52. Next pick and place device 50 may be retracted in direction 56 away from the front face of housing 11 (FIG. 2) carrying held stator core 10 out of housing 11. While pick and place device 50 holds stator core 10, termination fixture 22 remains in stator bore 10' such that extreme portion 22b continues to support wrapped portions of leads L1–L4.

Pick and place device 50 also may be provided with rotation capability so that it can rotate around axle 50'. Device 50 may be programmed to rotate around axle 50' to present stator core 10 in an orientation in which it (stator core) can be received or picked up by other conventional loading/unloading or transfer devices (not shown). The conventional transfer devices may have stator-holding mechanisms to grasp stator core 10 on free outer surfaces and receive stator core 10 from device 50. The conventional transfer devices may be used to place received stator core 10 in a transport pallet for movement to terminal connection workstations.

Stator core 10 may be placed in the transport pallet in an orientation suitable or convenient for further processing at the terminal connection workstations. Stator 10 may, for example, be placed in the transport pallet vertically (i.e., with stator bore 10' vertically oriented) so that the terminated leads L1–L4 are on the upper stator face. This vertical orientation may, for example, provide a clear visual view and unhindered physical access to terminated leads L1–L4 suitable for subsequent terminal connections by human operators.

The conventional transfer device which receive stator core 10 from pick and place device 50 and the transport pallets that are used to carry stator core 10 to terminal connection work stations may optionally be provided with auxiliary support fixtures to support terminated leads L1–L4 during transport. These auxiliary support fixtures may be cylindrical structures that are similar in diameter to extreme portion 22b on which the terminated leads L1–L4 are wrapped in the wire-winding machine. These cylindrical support structures may be disposed in an orientation parallel to the movement of the stator-holding mechanisms in the conventional transfer device. In operation, for example, in the transfer of stator core 10 from pick and place device 50, the support cylindrical structure disposed in the conventional transfer device may be aligned with extreme portion 22b to enable smooth receipt of the wrapped portions of leads L1–L4. Wrapped portions of leads L1–L4 may be transferred from extreme portion 22b to the cylindrical support structure by movement of the latter's stator-holding mechanisms parallel to the cylindrical support structure at the same time as same time as stator core 10 is transferred from device 50 to the conventional transfer device. In similar fashion, stator cores 10 held in the conventional transfer device with leads L1–L4 supported on the conventional transfer devices' cylindrical support structure may be transferred to the transport pallets with leads L1–L4 supported on the latter's auxiliary support fixtures.

One skilled in the art will appreciate that the present invention can be practiced by other than the described embodiments, which are presented for purposes of illustration and not of limitation. It will be understood that terms like "forward" and "backward", "front" and "rear", and other directional or orientational terms are used herein only for convenience, and that no fixed or absolute orientations are intended by the use of these terms.

What is claimed is:

1. A wire-winding machine comprising:
    a movable wire dispenser for winding wire coils on the poles of a dynamo-electric machine component;
    means for temporarily holding the wire leads of said wound wire coils;
    a shape-forming fixture disposed in said machine for winding said leads of said wire coils therearound; and
    a wire manipulator for grasping and manipulating said held wire leads along trajectories around said shape-forming fixture.

2. The wire-winding machine of claim 1 wherein said shape-forming fixture comprises an attachment portion for attaching said shape-forming fixture to a component pick and place device in said wire-winding machine.

3. The wire-winding machine of claim 2 wherein said component pick and place device comprises movable pliers for holding a stator.

4. The wire-winding machine of claim 1 wherein said shape-forming fixture is disposed relative to said dynamo-machine component so that a portion of said fixture protrudes from a front plane of said dynamo-machine component.

5. The wire-winding machine of claim 1 wherein said shape-forming fixture comprises a cylindrical structure.

6. The wire-winding machine of claim 1 wherein said shape-forming fixture comprises a structure for restraining movement of wires in said wound wire coils while said wire manipulator is manipulating said wire leads.

7. The wire-winding machine of claim 1 wherein said dynamo-electric machine component is a stator and wherein said shape-forming fixture comprises:
    a main trunk portion having a generally cylindrical shape conforming to a bore space of said stator between said poles;
    an extreme portion attached to said main trunk portion, wherein said extreme portion has a diameter that is smaller than the diameter of said main trunk portion, wherein said extreme portion extends beyond said poles when said fixture is inserted in the bore of said stator.

8. The wire-winding machine of claim 7 wherein said shape-forming fixture further comprises a key member disposed on a side of said main trunk portion, wherein said key member occupies the annular space that is adjacent to said stator poles in said stator bore when said shape-forming fixture is inserted in said stator bore.

9. The wire-winding machine of claim 1 wherein said wire manipulator comprises a grasping mechanism mounted on a movable arm that is moved with respect to the front plane of said dynamo-electric machine component.

10. The wire-winding machine of claim 9 wherein said grasping mechanism further comprises a mechanism that said grasped wire slides through as said movable arm moves parallel said front plane of said dynamo-electric machine component.

11. The wire-winding machine of claim 10 wherein said trajectories are designed to deform said wire leads against said shape-forming fixture to form freestanding patterns in said wire leads.

12. The wire-winding machine of claim 11 wherein freestanding patterns include a wire loop.

13. The wire-winding machine of claim 11 wherein said trajectories are designed to form said freestanding patterns that are physically staggered along an axis of said dynamo-electric machine component.

14. The wire-winding machine of claim 9 wherein said grasping mechanism is mounted on said movable arm so that said grasping mechanism freely rotates around its longitudinal axis Z.

15. The wire-winding machine of claim 9 wherein said movable arm moves in trajectories around a longitudinal axis of said dynamo-electric machine component.

16. A method for terminating wire coil leads in-situ in a wire-winding machine that is used to wind wire coils on the poles of a dynamo-electric machine component comprising:
    holding wound coil wire leads temporarily in grippers;
    disposing a shape-forming fixture about a front plane of said dynamo-electric machine component;
    using a wire manipulator to grasp and manipulate said held wire leads along trajectories around said shape-forming fixture to form patterns in said wire leads; and
    leaving said patterns freestanding.

17. A method of claim 16 wherein disposing a shape-forming fixture comprises disposing a structure to restrain movement of wires in said wound wire coils while said wire manipulator is manipulating said wire leads.

18. The method of claim 16 wherein said dynamo-electric machine component is a stator, and wherein disposing a shape-forming fixture comprises inserting said shape-forming fixture in a bore of said stator and that said shape-forming fixture includes:
    a main trunk portion having a generally cylindrical shape conforming to the bore space of said stator between said poles;
    an extreme portion attached to said main trunk portion, wherein said extreme portion has a diameter that is smaller than the diameter of said main trunk portion, and wherein said extreme portion extends beyond said poles when said fixture is inserted in the bore of said stator.

19. The wire-winding machine of claim 18 wherein said shape-forming fixture further includes disposing a key member disposed on a side of said main trunk portion, wherein said key member occupies the annular space that is adjacent to said stator poles in said stator bore when said shape-forming fixture is inserted in said stator bore.

20. The method of claim 19 wherein inserting said shape-forming fixture comprises inserting said shape-forming fixture that further includes an attachment portion for attaching said shape-forming fixture to a stator pick and place device in said wire-winding machine.

21. The method of claim 16 wherein said using said wire manipulator comprises:
using a grasping mechanism mounted on a movable arm that moves with respect to said front plane of said dynamo-electric machine component.

22. The method of claim 21 wherein using said grasping mechanism further comprises using a mechanism that said grasped wire slides through as said movable arm moves parallel said front plane of said dynamo-electric machine component.

23. The method of claim 21 wherein using said grasping mechanism further comprises using a grasping mechanism that is mounted on said movable arm so that said grasping mechanism freely rotates around its longitudinal axis Z.

24. The method of claim 23 wherein using said grasping mechanism further comprises causing said movable arm to move in a circular trajectory around a longitudinal axis of said dynamo-electric machine component.

25. The method of claim 16 wherein said manipulating said wire leads around said shape-forming fixture comprises deforming said wire leads to form freestanding patterns conforming to a surface of said shape-forming fixture.

26. The method of claim 16 wherein said freestanding patterns comprise loops.

27. The method of claim 16 wherein said manipulating said wire leads around said shape-forming fixture comprises sequentially deforming said wire leads to form freestanding patterns that are physically staggered along a longitudinal axis of said dynamo-electric machine component.

28. The method of claim 16 wherein said leaving comprises separating said shape-forming fixture from said wire leads leaving said wire leads with freestanding patterns suspended about a front face of said dynamo-electric machine component.

29. A method for making a dynamo-electric machine component comprising:
winding at least a wire coil in said dynamo-electric machine component, wherein said winding includes orienting at least a wire lead extending from said wound wire coil for subsequent manipulation; and
manipulating said oriented wire lead to form a freestanding wire pattern in said wire lead extending from said wound wire coil.

30. The method of claim 29 wherein said manipulating comprises using a movable wire manipulator for grasping a portion of said oriented wire lead.

31. The method of claim 29 wherein said manipulating comprises moving said oriented wire lead along a predetermined path to form said freestanding wire pattern.

32. The method of claim 29 wherein said winding comprises winding a plurality of wire coils and includes orienting a plurality of wire leads extending from said wound wire coils for subsequent manipulation, and wherein said manipulating comprises manipulating a multiplicity of said oriented wire leads to form freestanding wire patterns in said wire leads extending from said wound wire coils.

33. The method of claim 32 wherein said manipulating comprises moving said multiplicity of oriented wire leads along predetermined paths to form said freestanding wire patterns.

34. The method of claim 33 wherein said manipulating further comprises forming said freestanding wire patterns about an axis of said dynamo-electric machine component.

35. The method of claim 33 wherein said moving comprises sequentially moving said oriented wire leads along said predetermined paths to form said freestanding wire patterns that are physically staggered along said axis.

36. The method of claim 29 wherein said manipulating said oriented wire lead to form a freestanding wire pattern comprises using a shape-forming fixture.

37. The method of claim 36 wherein said using a shape-forming fixture comprises disposing said shape-forming fixture in a predetermined position with respect to said dynamo-electric machine component.

38. The method of claim 37 wherein said dynamo-electric machine component is a stator, and wherein said disposing said shape-forming fixture comprises inserting said shape-forming fixture through a bore of said stator.

39. The method of claim 36 wherein using a shape-forming fixture, further comprises using a member for confining wire in said wound wire coils during said manipulating to form a freestanding wire pattern in said wire lead extending from said wound wire coil.

40. The method of claim 36 wherein said manipulating said oriented wire lead to form a freestanding wire pattern comprises deforming said oriented wire lead to conform to a surface of said shape-forming fixture.

41. The method of claim 36 wherein using a shape-forming fixture further comprises using a shape-forming fixture that has a cylindrical shape-forming surface.

42. The method of claim 36 wherein said manipulating said oriented wire lead to form a freestanding wire pattern, further comprises separating said shape-forming fixture and said deformed wire lead to obtain said freestanding pattern in said wire lead extending from said wound wire coil.

43. The method of claim 29 wherein said orienting said wire lead extending out of said wound wire coil comprises holding said wire lead in a predetermined position with respect to said dynamo-electric machine component.

44. A machine for making a dynamo-electric machine component comprising:
a wire-winding mechanism for winding wire coils in said dynamo-electric machine component, wherein said wire-winding mechanism includes means for fixing the orientation of the wire leads extending from said wound wire coil for subsequent manipulation; and
a wire manipulator for manipulating said fixed-orientation wire leads to form freestanding wire patterns in said wire leads extending from said wound wire coils.

45. The apparatus of claim 44 wherein said a wire manipulator comprises a movable wire manipulator for grasping a portion of one of said fixed-orientation wire leads.

46. The apparatus of claim 45 wherein said movable wire manipulator comprises a manipulator that moves said grasped wire lead along a predetermined path to form said freestanding wire pattern.

47. The apparatus of claim 45 wherein said movable manipulator further comprises a manipulator that moves said grasped wire lead along a predetermined path about an axis of said dynamo-electric machine component.

48. The apparatus of claim 45 wherein said movable manipulator also sequentially grasps portions of said fixed-orientation leads and moves said grasped wire leads along said predetermined paths about an axis of said dynamo-electric machine component to form said freestanding wire patterns that are physically staggered along said axis.

49. The apparatus of claim 44 further comprising a shape-forming fixture for forming said freestanding wire patterns.

50. The apparatus of claim 49 wherein said shape-forming fixture further comprises a cylindrical shape-forming surface.

51. The apparatus of claim 49 wherein said shape-forming fixture is disposed in a predetermined position with respect to said dynamo-electric machine component.

52. The apparatus of claim 49 wherein said a shape-forming fixture is movable.

53. The apparatus of claim 52 wherein said dynamo-electric machine component is a stator, and wherein said movable shape-forming fixture can be inserted through a bore of said stator.

54. The method of claim 49 wherein said shape-forming fixture comprises a member for restraining wire movement in said wound wire coils while said wire manipulator is used to form said freestanding wire patterns in said wire leads extending from said wound wire coil.

55. The method of claim 49 wherein said wire manipulator comprises a wire manipulator mechanism for slidably grasping wire portions and deforming said fixed-orientation oriented wire leads to conform to a surface of said shape-forming fixture.

56. The apparatus of claim 55 wherein said shape-forming fixture is separable from said deformed wire leads to obtain said freestanding pattern in said wire lead extending from said wound wire coil.

57. The apparatus of claim 44 wherein said means for fixing the orientation of the wire leads extending from said wound wire coil for subsequent manipulation comprises means for holding said wire leads in predetermined positions with respect to said dynamo-electric machine.

* * * * *